Figure 12:
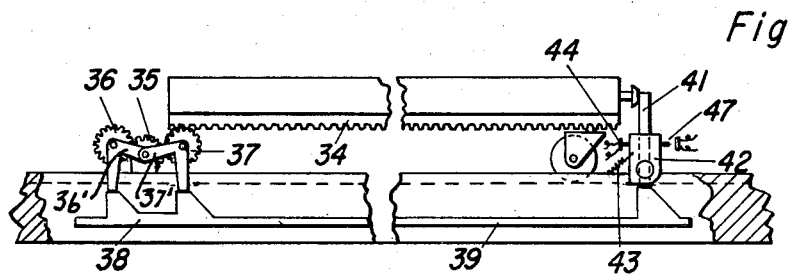

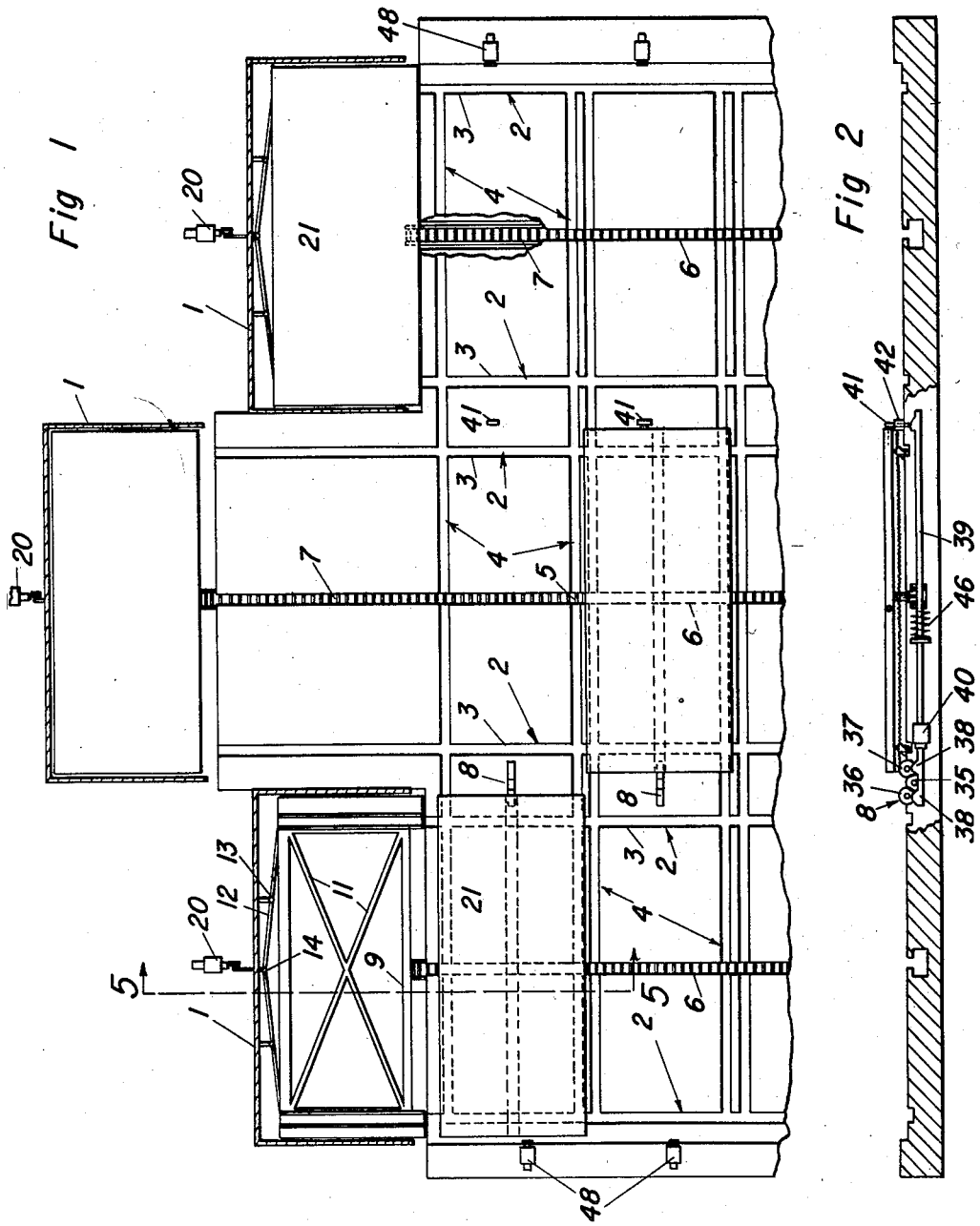

Aug. 19, 1958     O. A. SEMLER     2,848,121
AUTOMATIC STORAGE SYSTEM
Filed Aug. 24, 1953     3 Sheets-Sheet 2
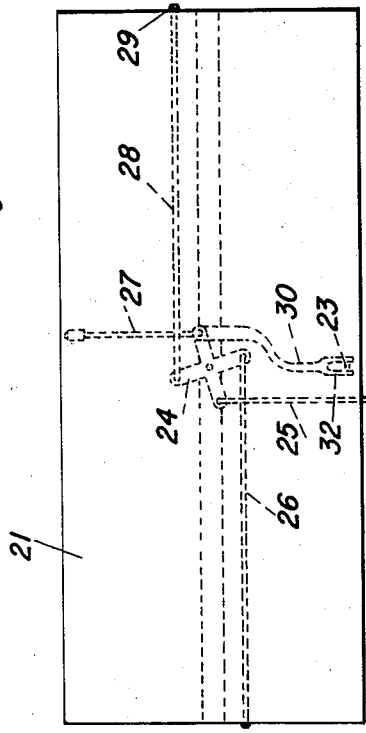
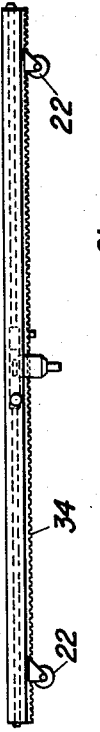
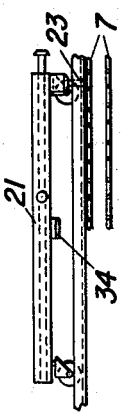
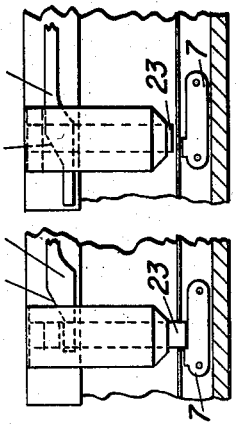
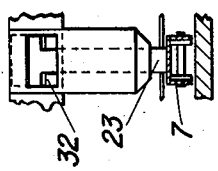
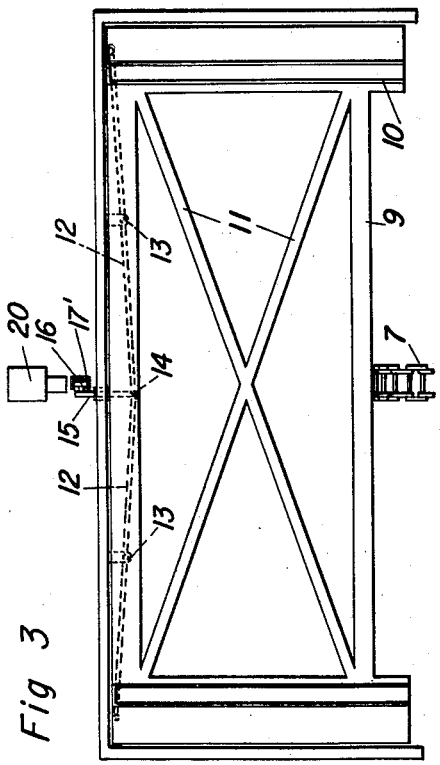
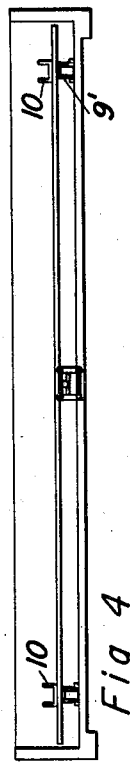
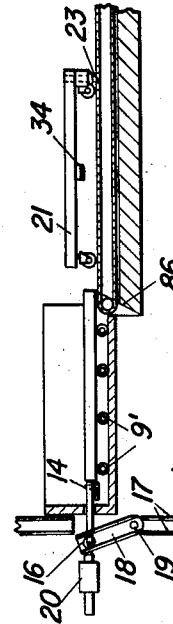
INVENTOR.
Oskar A. Semler
BY
A. Schapp
Att'y Aug. 19, 1958  O. A. SEMLER  2,848,121
AUTOMATIC STORAGE SYSTEM
Filed Aug. 24, 1953  3 Sheets-Sheet 3

INVENTOR.
Oskar A. Semler
BY
A. Schapp
Att'y

United States Patent Office 2,848,121
Patented Aug. 19, 1958

2,848,121

AUTOMATIC STORAGE SYSTEM

Oskar A. Semler, San Francisco, Calif.

Application August 24, 1953, Serial No. 375,949

5 Claims. (Cl. 214—16.1)

The present invention relates to improvements in an automatic storage system, and the present application is a continuation-in-part of my previous application, Serial Number 298,243, on an Automatic Garage, filed July 11, 1952, now abandoned.

The principal object of the invention is to provide a storage system adapted for use in garages for motor vehicles, in which the vehicles are placed on movable platforms and the latter are moved mechanically to designated places and are returned mechanically to the customer.

It is further proposed to provide a system of the character described in which the space available is utilized to the best advantage and the amount of service required is reduced to a minimum.

In pursuance of these objects, it is proposed to divide the space available into one or more sets of three adjacent lanes, each corresponding in width to the maximum length of motor vehicles to be parked, and to utilize the two outer lanes for parking and the middle lane for de-parking.

It is further proposed to provide means for automatically parking the vehicles, or the platforms carrying the same, in solid lines in the outer lanes, each new vehicle automatically finding its place immediately adjacent the next preceding vehicle in its respective lane.

It is further proposed to provide means whereby upon removal of one of the vehicles from the outer lane, all of the succeeding vehicles in said lane automatically move up to again form a solid line and to make room for an additional vehicle at the rear end of the line.

It is further contemplated to make the system available for use in connection with a garage having a number of stories or floors, with an elevator at the receiving end of each outer lane and at the discharge end of the central lane, and automatically operating means for lifting the elevator to a designated floor, for initiating movement of the vehicle from the elevator upon the floor, for advancing the vehicle along the lane to a point immediately adjacent the next preceding vehicle and for stopping the vehicle when it has reached its designated place.

It is additionally proposed, in the de-parking mechanism, to automatically move the central elevator to the floor of the parked vehicle, to automatically move the parked vehicle or its platform from the outer lane upon the central lane, to automatically advance the vehicle toward and into the elevator and to cause the latter to return to the ground floor for delivery to the customer.

And finally, it is proposed to provide a control system for the parking and de-parking operations whereby the customer, upon initiating the parking operation, automatically receives a key corresponding to an identifying plate for the platform carrying his vehicle and whereby the customer may initiate de-parking by applying the key to the identifying plate, the latter having a definite place in a line of other identifying plates and being made to automatically advance in its line when the vehicle is advanced in its lane.

Further objects and advantages of my invention will appear as the specification proceeds, and the new and novel features of my automatic storage system will be fully defined in the claims attached hereto.

Figure 13:
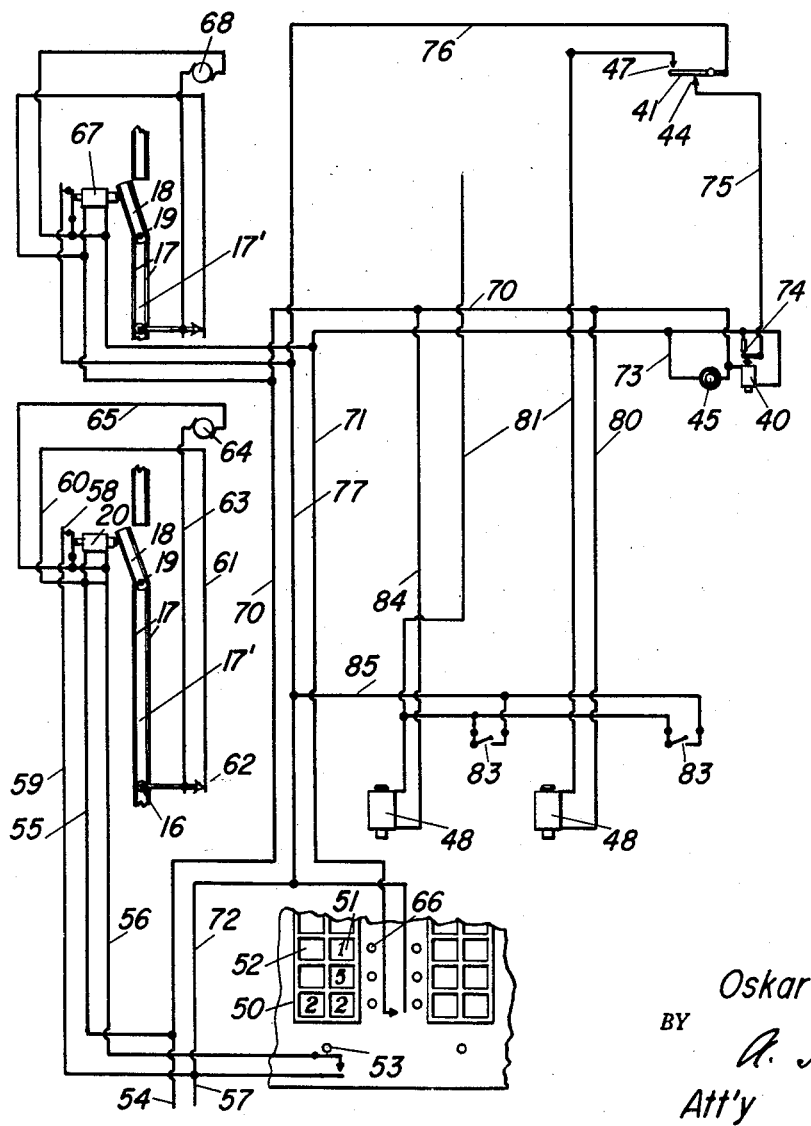

The preferred form of my invention is illustrated in the accompanying drawing, forming part of this application, in which:

Figure 1 shows a fragmentary plan view of a floor served by three elevators, the floor being intended to represent an upper story of a garage warehouse, or the like;

Figure 2, an end view of the same;

Figure 3, an enlarged plan view of an elevator having a platform-supporting frame movable thereon;

Figure 4, a fragmentary end view of the elevator;

Figure 5, a fragmentary side view of the same;

Figure 6, a plan view of a platform or carrier used in my invention;

Figure 7, an end view thereof;

Figure 8, a side view of the same, as coupled to an endless chain;

Figure 9, an enlarged detail view showing the coupling device used in connection with the platform as viewed from in front;

Figure 10, a side view of the coupling device in active position;

Figure 11, a similar side view showing the coupling in inactive position;

Figure 12, an enlarged detail view of a portion of Figure 2;

Figure 13, a wiring diagram.

While I have shown only the preferred form of my invention, I wish to have it understood that various changes or modifications may be made within the scope of the claims attached hereto, without departing from the spirit of the invention.

Referring to the drawing in detail, Figure 1 shows a general floor plan of an upper story, which, for a single unit, should have a width somewhat in excess of three vehicle-lengths, and may be of any desired length.

At one end of the floor are shown three elevators 1, each being of a width to accommodate the length of a motor vehicle, and the floor is divided lengthwise into three lanes, each lane being identified by a track 2 consisting of two parallel grooved rails 3. The floor is further divided into transverse lanes identified by a series of transverse tracks 4, in the form of grooved rails, which latter communicate with the longitudinal rails, as at 5, to form slightly enlarged intersections which allow platforms supported on suitably spaced swivel rollers to move in the tracks lengthwise and crosswise. The longitudinal tracks come up to within close proximity of the elevators.

The central elevator 1 is off-set with respect to the outer ones, to allow motor vehicles on the corresponding ground floor, to freely drive into the outer elevator and out of the central elevator, under their own power.

The longitudinal lanes are formed with central, longitudinal grooves 6 adapted to have endless chains 7 operate therein for advancing the platforms longitudinally in the lanes. The chains may be operated, either continuously or upon actuation, by suitable machinery, not shown.

The transverse lanes have actuating means, generally indicated at 8, for moving the platforms from either of the outer longitudinal lanes into the central lane. While, in the interest of economy, it is desirable to have two outer lanes, it is apparent that the two outer lanes cooperate with the central lane in the same manner, and the description, therefore, will be confined principally to the cooperation of one of the outer lanes with the central lane.

The elevator floor has a frame 9 supported thereon by means of rollers 9', the frame comprising a pair of spaced rails 10 adapted for lining up with the rails of the floor track and inter-connected with diagonal rods 11. The inner ends of the rails are interconnected by two links 12 which are pivoted, as at 13 and interconnected at their free ends at the pivot 14.

The pivot 14 is connected to the plunger 15 projecting rearwardly of the elevator and having a roller 16 adapted to ride between the flanges 17 of a vertical rail 17' mounted behind the elevator. The rail includes a movable section 18 hinged at a point slightly below the floor level, as at 19, and adapted for being pulled backward to an inclined position by a magnet 20.

When the section is in this position (see Figure 5) and the elevator approaches the floor level, the plunger is pulled backward by said section, and pulls the pivot 14 backward, with the result that the two links 12 swing on their respective pivots 13 and push the rails 10 outward and up against the registering floor rails and over the near end of the chain 7.

The frame 9 carries the platform 21 which is used as a support for the vehicle, the platform being rectangular in shape and of dimensions somewhat in excess of the length and width of the motor vehicle.

The platform is supported on four rollers 22 swingable on vertical axes and suitably spaced to correspond to the spacing between the rails of the longitudinal and transverse tracks in the floor. The platform has a pin 23 slidable vertically in the forward portion thereof, and this pin is adapted to engage in the chain 7 when the frame is pushed outward so as to couple the platform to the chain and to cause the platform to advance with the chain.

The platform is preferably made hollow to present an inner chamber in which is mounted suitable mechanism for uncoupling the platform from the chain when the platform has reached its designated place, either at the end of the lane or adjacent the next preceding platform.

The mechanism comprises a cross 24 pivoted in the platform on a vertical axis, substantially in the center thereof, and having four rods 25, 26, 27 and 28 pivoted to the arms thereof. The rod 25 extends straight forward and is guided in the front wall of the platform, and provided with a button 29 at the front end thereof. The rod 27 extends straight rearward and may be considered an idler for the purpose of the present description. The two rods 26 and 28 extend straight sidewise in opposite directions and are similarly guided in the side walls of the platform and provided with similar buttons.

The rods are dimensioned in such a manner that when the buttons on the sides of the platform bear on the side edges, the other two buttons are projecting outward, and vice versa.

One side of the cross has a bar 30 pivoted thereto, this bar being suitably guided to run parallel to the companion rod 25. When the rod 25 is pushed inward, its companion bar 30 is pushed outward, this movement also resulting in inward movement of the rod 27, while at the same time both rods 26 and 28 move outward.

The bar 30 is formed at its outer end with a fork 32 adapted to straddle the coupling pin 23 underneath its head and formed with upper wedge faces 33 adapted to raise the pin for uncoupling the same from the chain when the bar is pushed forward. It is apparent that when the platform on its forward movement approaches a previously placed platform, its forward button 29 is forced inward by the impact, with the result that its companion wedge lifts the coupling pin out of engagement with the chain.

In this manner successive platforms rising in the elevator may be parked in either of the outer lanes in solid formation until the entire space is filled, each platform having its supporting rollers lined up with the rails of a transverse track.

For de-parking any individual platform, the latter is first made to advance sidewise into the middle lane and to then advance in a reverse direction on the latter lane for movement into the central elevator.

The means for moving each platform sidewise, from one of the outer tracks upon the inner track is shown at 8 in Figures 1 and 2, and in detail in Figure 12. Each platform has at its bottom a transverse and downwardly presented rack 34 extending centrally throughout the length thereof, and any suitable mechanism may be used to engage the rack and to pull the platform from one lane to the other.

In the form shown, I provide, in a comparatively narrow space left between adjacent longitudinal lanes, and centrally located with respect to each transverse lane, a mechanism comprising a suitable frame structure having a drive gear 35 revolvable therein, and having two gears 36 and 37 meshing with the drive gear for rotation in the same direction and in the same horizontal plane the two drive gears being necessary to bridge the gap between the two lanes, so as to allow one of the gears (36) to grip the rack while the platform is on one of the outer lanes, while the other gear (37) continues the drive toward the end to bring the platform fully into the center lane.

The two gears 36 and 37 are normally positioned in a horizontal plane slightly below the rack, but are mounted on arms 36' and 37' swingable on the axis of the drive 35 and may be raised to bring the gears into the plane of the rack by any suitable means, as by a pair of wedges 38 on a rod 39, which latter may be operated by an electro-magnet 40.

Thus, when the magnet 40 is energized, with the gears active, the gear 36 enters into engagement with the rack and pulls the platform over the gap between the lanes, whereupon the other gear 37 also engages the rack, the two gears cooperating is continuing the pull, until at the end of the travel, the gear 37 alone continues the movement.

As the platform reaches its proper place in the middle lane, its button 29 on the rod 28, which at this time is in the projecting position, due to the fact that the button 29 on the rod 25 was pushed inward by the previous impact upon a preceding platform, strikes a pin 41 mounted in the gap between the middle lane and the other outer lane and is pushed inward thereby. This causes the button 29 of the rod 25 to move outward, and to retract the bar 30 within the platform, which releases the pin 23 for coupling engagement in the chain 7 of the middle lane, the upper stretch of which runs toward the middle elevator.

Thus, the platform automatically changes its course and moves toward the central elevator which has been previously readied to receive the platform, with its frame tracks lined up with the tracks of the central lane, in the manner previously described with respect to the outer elevator. After the central elevator has been properly loaded, it automatically returns to the main floor for return of the motor vehicle to the customer.

The pin 41 is slidable in the sleeve 42, which is mounted in the floor with slight freedom of tilting motion, against the opposition of spring 43. After the pin has served its function of pushing back the button 29, it is tilted outward by the advancing platform sufficiently to open a switch 44 in the circuit of the electro-magnet 40 and of the motor 45 driving the drive gear 35, causing the motor to stop and the rod 39 to return under the influence of a spring 46 to allow the gears 36 and 37 to drop into inactive position.

When the pin 41 tilts, under the impact of the platform, it also closes a switch 47 in the circuit of an electro-magnet 48 disposed opposite the station next succeeding the station which has been evacuated, and the latter magnet, upon being energized, operates, by any suitable means, the side button 29 of the platform occupying said station for retracting the bar 30 of said platform and for allowing its coupling pin 23 to drop for engagement with the chain to advance the platform to the evacuated station.

Each advancing platform again operates, through any suitable switch mechanism, as by switches 83 located in the tracks and indicated in the wiring diagram of Figure 13, the magnet of the next succeeding station, to advance the next platform, so that when one platform is removed from one of the stations in one of the outer lanes, all the succeeding platforms automatically move up to cover the gap and to make room for additional platforms.

The operation of my storage system may be further explained by means of the wiring diagram of Figure 14, in which a key-board 50 is provided for each outer lane of each floor. Each key-board has a vertical slot 51 adapted to receive identifying plates for different platforms in vertical succession. Opposite each plate is a lateral slot 52 adapted to receive a key cooperating with its plate in rendering the circuit active. The keyboard works automatically by conventional means, not shown, to drop an identifying plate into the slot from above and to deliver the corresponding key to the customer, upon operation of the switch 53.

For recovering the motor vehicle, the customer places his key opposite the plate identifying his motor vehicle, whereupon the system becomes active for returning the platform carrying his vehicle.

Let it be assumed that the operator or customer has driven his motor vehicle on the ground floor into one of the outer elevators 1 which has been previously equipped with the frame 9 and the platform 21 on top of the frame, with the upper surface of the platform on a level with the ground floor.

The operator then closes the switch 53, with the following effects:

(1) The key-board mechanism drops an identifying number plate into the slot 51 to come to rest on the number plates already present. At the same time the mechanism delivers to the operator a key plate corresponding to the number plate.

(2) A current flows from the main line wire 54 through wire 55, the magnet 20, wire 56, switch 53 and back to the main line wire 57. The magnet pulls out the section 18 of the channel 17' and sets the latter section for pushing out the frame 9 when the elevator arrives at the designated floor.

(3) The magnet 20 closes the holding switch 58 which allows current flowing through the magnet to continue through return wire 59 after the switch 53 has been released.

(4) A current flows from the main line 54 through wires 55, 60, 61, switch 62, wire 63, elevator motor 64, and wire 65 back through switch 58 and wire 59 to the line wire 57. As the elevator reaches a designated floor, the roller 16 is retracted by the channel section 18 and opens the motor circuit so as to bring the elevator to a stop.

(5) Roller 16, being drawn back by the channel section 18, operates the link mechanism of the frame 9 for pushing the latter part way out of the elevator.

(6) The coupling pin 23 engages in the chain 7 and pulls the platform along the outer lane until the button 29 strikes a preceding platform or a suitable stop at the end of the lane for uncoupling the pin 23 so as to allow the platform to come to rest immediately adjacent the preceding platform.

For de-parking his automobile, the operator first inserts his key opposite his identifying plate in the slot 51. This closes a switch (not shown), rendering the respective deparking circuit active and also causes the identifying plate to be removed, so as to allow succeeding plates to drop to keep the line of plates continuous. The operator then closes the switch 66 opposite his identifying plate, with the following effects:

(1) The closing of the switch energizes the electro- magnet 67 and the motor 68 of the middle elevator for raising the elevator to the designated floor and for pushing out the frame 9 of the second elevator in the same manner as previously described with respect to the outer elevator.

(2) A current flows from line wire 54 through wire 70, electro-magnet 40, wire 71, switch 66, and wire 72 back to line wire 57. This current energizes the magnet 40 which operates the rod 39 with its wedges for raising the gears 36—37 into the plane of the rack underneath the platform and for lifting the pin 41 into operative position.

(3) At the same time, the same current flows, through the by-pass wire 73, to drive the motor 45 which drives the gears 36—37 for moving the platform transversely into the middle lane.

(4) The energized magnet 40 closes a switch 74 which, through wires 75—76—77 keeps the circuit closed when the switch 66 is released.

(5) As the platform reaches its end position in the central lane, its button 29 strikes the pin with the immediate result that its coupling pin engages in the chain of the central lane for movement toward the central elevator.

(6) Immediately thereafter, the platform causes the pin 41 to tilt and to open the switch 44, which opens the circuit of the magnet 40 and the motor 45, causing the gears 36—37 to stop and allowing the said gears and the pin 41 to return to inactive position.

(7) As the platform reaches the elevator, it enters upon the frame, which has been previously positioned, and closes a suitable switch, not shown, for starting the elevator on its downward travel. As the elevator starts, the roller 16 pulls in the movable section 18 and operates the link mechanism for pulling the frame into the elevator, the floor adjacent the elevator being cut on an incline, as at 86, to allow the frame to clear the floor as it is retracted.

(8) The tilting movement of the pin 41 closes the switch 47 for energizing the electro-magnet 48, the current flowing from line wire 54 through wires 70, 80, the magnet 48, wire 81, switch 47 and wire 76 back to the line wire 57. The electro-magnet pushes inward the button 29 of the next succeeding platform and causes the latter to engage in the chain for moving up into the space vacated by the preceding platform.

(9) The second platform, in moving into the position of the preceding one, closes a switch 83, for energizing the next magnet 48, which caused the third platform to move into the place vacated by the second platform, the current flowing from the main wire 54 through wires 70, 84, magnet 48, switch 83, and wires 85 and 77, back to line wire 57.

The grooves 6 in which the chains 7 operate have been shown of exaggerated width in Figure 1 to bring out the salient features more clearly. In actual practice, they should be sufficiently narrow to allow the wheels of the platform to pass thereover, or suitable means operable by the wheels, should be provided for bridging the grooves.

I claim:

1. In a storage system of the character described, a horizontally disposed longitudinal grooved track having a series of transverse grooved tracks connecting therewith, a series of platforms having swiveled supporting rollers adapted to ride in any of the tracks, means for moving a series of platforms upon the longitudinal track to form a continuous line, with the rollers of successive platforms in registry with successive transverse tracks, means operable for advancing any one of the platforms upon its transverse track to produce a gap in the continuous line of platforms, and means operative in response to the advance of any platform along the transverse track to cause the platform next in line on the longitudinal track to advance to fill the gap.

2. In a storage system of the character described, a horizontally disposed longitudinal grooved track having a series of transverse grooved tracks connecting therewith, a series of platforms having swivelled supporting rollers adapted to ride in any of the tracks, means for moving a series of platforms upon the longitudinal track to form a continuous line, with the rollers of successive platforms in registry with successive transverse tracks, means operable for advancing any one of the platforms upon its transverse track to produce a gap in the continuous line of platforms, and means operative in response to the advance of any platform along the transverse track to cause the platform next in line on the longitudinal track to advance to fill the gap, with means operative in response to a gap-filling movement of any one of the platforms for advancing the next platform to fill the gap left by the preceding platform.

3. In a storage system of the character described, a pair of parallel, horizontally disposed longitudinal grooved tracks having a series of transverse grooved tracks connecting the same in evenly spaced relation, a series of platforms, each having swiveled supporting rollers adapted for riding in the tracks longitudinally and transversely, means for successively advancing individual platforms on one of the longitudinal tracks, means for automatically uncoupling each platform from its advancing means as the platform reaches the next preceding platform, the platforms and the rollers being dimensioned and positioned with respect to the spacing between the transverse tracks to bring the rollers of successive platforms into registry with successive transverse tracks as the platforms come to a stop, means operable for advancing any selected platform upon its registering transverse track including means for automatically stopping the advance when the platform reaches a position of registry with the second longitudinal track, and automatically operating means for advancing the platform on the second longitudinal track in a reverse direction.

4. A storage system as defined in claim 3, in which means are provided operative in response to the advance of any platform along its transverse track to cause the platform next in line on the longitudinal track to advance to fill the gap.

5. A storage system as defined in claim 3, in which means are provided operative in response to the advance of any platform along its transverse track to cause the platform next in line on the longitudinal track to advance to fill the gap, with means operative in response to a gap-filling movement of any one of the platforms for advancing the next platform to fill the gap left by the preceding platform.

References Cited in the file of this patent

UNITED STATES PATENTS

| | | |
|---|---|---|
| 1,584,080 | Dinkelberg | May 11, 1926 |
| 1,717,545 | Bell | June 18, 1929 |
| 1,775,799 | Young | Sept. 16, 1930 |
| 1,824,340 | Geiger | Sept. 22, 1931 |
| 2,619,916 | Rainier | Dec. 2, 1952 |
| 2,635,555 | Hansson | Apr. 21, 1953 |
| 2,650,728 | Goodwyn | Sept. 1, 1953 |
| 2,722,322 | Gunderson | Nov. 1, 1955 |

FOREIGN PATENTS

| | | |
|---|---|---|
| 85,704 | Sweden | Feb. 25, 1936 |
| 612,793 | Great Britain | Nov. 17, 1948 |